United States Patent Office 2,853,520
Patented Sept. 23, 1958

2,853,520

CONVERSION OF ETHYNYL COMPOUNDS TO ACETYL COMPOUNDS

Melvin S. Newman, Columbus, Ohio, assignor, by mesne assignments, to The Ohio State University Research Foundation No Drawing. Application November 5, 1953
Serial No. 390,424

10 Claims. (Cl. 260—586)

The invention disclosed and claimed in this application relates to a new catalytic synthetic resin, a method of producing the resin, and a method of using the resin as a catalyst to convert ethynyl compounds (i. e. those containing the acetylinic function —C≡C—) to ketonic compounds by the addition of water. The catalytic resin which I produce, I derive from a synthetic resin of the sulfonated polystyrene type. I render this resin more effective and particularly active by the replacement of some but not all of the acidic hydrogens by mercuric ions.

The inventions disclosed are important because they (a) give known products in better yields; (b) make isolation of such products easier since the resin can be easily filtered off and the isolation of the products becomes relatively simple; (c) make a continuous process possible wherein the reactants are caused to flow over a catalyst bed maintained at a suitable temperature; and (d) make it possible to reuse the same resin in batch runs.

Many of the starting compounds used by me and many of the products resulting from the process utilizing my improved synthetic resin catalysts are old, such as for example, 4-octyne, 4-octanone, 1-ethynylcyclohexene, 1-acetylcyclohexene, acetylene, acetaldehyde, propargyl alcohol, hydroxyacetone, 1-ethynylcyclohexanol, 1-acetylcyclohexanol, 3-methyl-3-hydroxy-1-butyne, and 3-methyl-3-hydroxy-2-butanone.

I have discovered in my work leading to the claimed invention herein that I can arrange ethynyl hydroxyl compounds to ketonic, carbonyl, or acetyl compounds by use of a synthetic resin of a sulfonated polystyrene type. For example, I have discovered that I can convert certain ethynyl hydroxyl compounds having the following structural formula

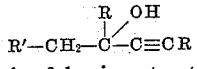

to isomers having the folowing structural formula

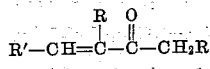

As other examples, I have discovered that I can convert ethynylcyclohexanol to acetylcyclohexene, diethylethynylcarbinol to 3-ethyl-3-pentene-2-one and 1-ethynyl-2,2,6-trimethylcyclohexanol to 1-acetyl-2,2,6-trimethylcyclohexene.

I have discovered moreover that by my improved mercury-fortified catalyst I can add water to compounds having an ethynyl function to convert them to similar ketonic compounds. I believe that it is old to use mercury as a catalyst in a homogeneous mixture with formic acid (or possibly with other strong acids) with some of the reactants which I convert in my improved process. However, in such cases, the reactants are in solution and are separated only with great difficulty. With my improved process I obtain better yields, the products are more easily separated, recovered and purified.

My inventions disclosed and claimed herein thus relate to a new process of and a new catalyst for adding water to compounds containing the ethynyl function —C≡C—. These inventions also relate to methods for forming the new catalyst. Ethynyl hydrocarbons (i. e. R—C≡C—R' where R and R' represent alkyl, aryl, aralkyl, cycloalkyl or alkenyl radicals or hydrogen) are suitable reactants. Ethynyl alcohols

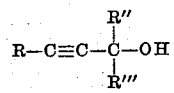

are of course also suitable reactants inasmuch as such alcohols are merely species of the ethynyl hydrocarbons designated in lines 4 and 5 above where R' is

The process of the conversion of ethynyl hydrocarbons to acetyl hydrocarbons proceeds according to the following equation:

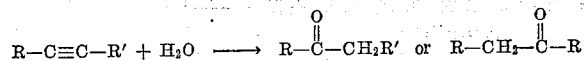

One of the objects of my invention therefore is to provide a process of forming a new catalyst.

A further object of my invention is the provision of a new catalyst for use in chemical reactions.

A further object of my invention is the obtaining of known products in better yields and at less expense.

A further object of my invention is the provision of a method by which easier isolation of the catalyst and of the products is possible than under previous processes.

A further object of my invention is the provision of a continuous process for the formation of compounds with ketonic functions.

A further object of my invention is the provision of a process for the conversion of ethynyl compounds to those having ketonic functions in which it is possible to reuse the catalyst over and over.

A further object of my invention is a new process for the conversion of acetylene to acetaldehyde.

Further objects and features will be apparent from the subjoined specification and claims.

Generally in the performance of my process of preparing the new catalyst I take a synthetic resin of the sulfonated polystyrene type such as that known by the tradename of Dowex 50 (200–400 mesh). For each 100 grams of resin to be used I dissolve about 1 gram of mercuric oxide in dilute sulfuric acid. Then I stir the resin into this dilute sulfuric acid and then wash well with water as by decantation about 15 times. I then collect the resin, air dry and dry in a vacuum desiccator over anhydrous calcium chloride for two or three days. By this process the resin is rendered particularly effective by replacing some but not all of the acidic hydrogen by mercuric ions.

Generally in the use of this catalyst I make a solution of the compound to be converted. This solution can be in any suitable solvent. For example, I can dissolve in water and then add a quantity of the treated resin, heat and reflux the solution and then remove the resin by filtration.

The reactant should be liquid or in solution. The solution should be neutral or acid. The organic product can be removed by any convenient method such as, for example, by mixing into ether and washing the ether layer with water and alkali. When I use my improved synthetic resin catalyst to which mercuric ions have been added, I can, in the presence of water, convert any ethynyl compound of the formula:

to compounds having the formulas:

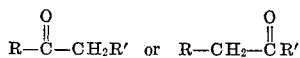

where R and R' represent alkyl, aryl, aralkyl, cycloalkyl or alkenyl radicals or hydrogen. A solvent for the reactant is usually desirable and sometimes necessary. Such solvent must dissolve the organic compound to be reacted (i. e. the reactant), but not the resin which serves as a heterogeneous catalyst. It can be water or a mixture of water and organic liquid such as lower molecular alcohols, organic acids, ethers which are miscible with water, e. g. acetic acid, ethyl alcohol, propyl alcohol, dioxane, tetrahydrofurane. The solution should be neutral or acidic.

Heat is sometimes desirable to get reasonable yields and refluxing is usually preferable.

Heat is supplied where necessary to secure a favorable reaction.

Following are examples of the practice of my invention:

EXAMPLE I

Conversion of 4-octyne to 4-octanone $CH_3CH_2CH_2C{\equiv}CCH_2CH_2CH_3 + H_2O \longrightarrow$
$C_8H_{14}(110)$

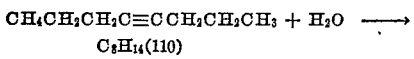
$C_8H_{16}O(128)$

A stirred mixture of 24.4 g. (0.222 mole) of 4-octyne, 80 cc. of acetic acid, 8 cc. of water, and 20 g. of Dowex 50 Hg++ resin was heated to reflux for 200 minutes. The resin was removed by filtration and the acetic acid was neutralized with alkali. The organic product on fractionation yielded 22.5 g. of pure 4-octanone, B. P. 68–70° at 17 mm. and 2.7 g. of pure 4-octyne, B. P. 126–127°, was recovered. (Note that the resin used in this example and designated as Dowex Hg++ resin is a resin treated according to my process as described more in detail below in Example VIII. Similar resins used in later examples are similarly designated.)

EXAMPLES II

Conversion of 1-ethynylcyclohexene to 1-acetylcyclohexene

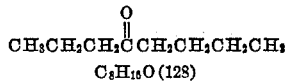

$C_8H_{10}(106)$   $C_8H_{12}O(124)$

A stirred mixture of 14.6 g. of 1-ethynylcyclohexene B. P. 74.5° at 66 mm., $n_D^{17}$ 1.4920, 60 cc. of acetic acid, 6 cc. of water, and 15 g. of Dowex-50 Hg++ resin was heated to reflux for seventy minutes. After cooling, filtering off the resin, and neutralizing the acetic acid the organic products were taken into ether. After washing and drying, the ether solution was rectified to yield 10.8 g. (63%) of 1-acetylcyclohexene, B. P. 75–78° at 8 mm.

EXAMPLE III

Hydration of acetylene to acetaldehyde $HC{\equiv}CH + H_2O \rightarrow CH_3CHO$ A slow stream of pure acetylene was bubbled through a stirred mixture of 2 g. of Dowex-50 Hg++ resin in 100 cc. of distilled water at 24° for twenty mintues. The resin was then removed by filtration. The filtrate smelled strongly of acetaldehyde. This compound was isolated as its 2,4-dinitrophenylhydrazone which proved to be that of acetaldehyde. Its identity was confirmed by mixed melting point and infrared spectral analysis.

EXAMPLE IV

Hydration of propargyl alcohol to hydroxyacetone

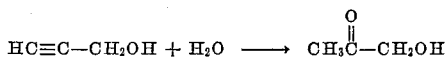

On adding 2 g. of Dowex-50 Hg++ resin to a stirred solution of 10.4 g. of propargyl alcohol in 100 cc. of distilled water at 23° the temperature began to rise spontaneously. After 13 minutes the temperature stood at 55° and further rise was stopped by slight cooling. After 25 minutes more the temperature was 40°. On standing one hour the temperature returned to 25°. A qualitative color test for the presence of acetylenic hydrogen, using aqueous alcoholic silver nitrate solution and universal indicator paper, was negative. After removal of the resin, the presence of a considerable quantity of hydroxyacetone was demonstrated by preparing the semicarbazone, M. P. 193–196° w. decomp., and the phenylhydrazone, M. P. 99–101°, from aliquots of the reaction mixture. These melting points agree with those reported in the literature.

EXAMPLE V

Hydration of 1-ethynylcyclohexanol to 1-acetylcyclohexanol

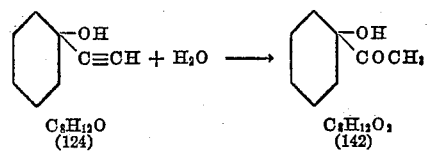

$C_8H_{12}O$ (124)    $C_8H_{14}O_2$ (142)

A stirred mixture of 44.6 g. (0.359 mole) of 1-ethynylcyclohexanol, 200 cc. of methanol, 17 cc. of water, and 25 g. of Dowex-50 Hg++ resin was refluxed for six hours. After removing the resin the organic products were rectified to yield 43.8 g. (86%) of 1-acetylcyclohexanol, B. P. 80–83° at 7–8 mm., $n_D^{29.5}$ 1.4695. No quantitative test for acetylenic hydrogen was given by this product. The oxime, M. P. 107–108° and semicarbazone, M. P. 217–218° w. decomp., were prepared, in agreement with literature values.

EXAMPLE VI

In a similar way to Example V, 3-methyl-3-hydroxy-2-butanone,

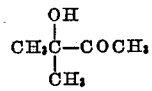

B. P. 137–137.4° at 750 mm., was prepared from 3-methyl-3-hydroxy-1-butyne

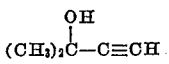

EXAMPLE VII

3-hydroxy-3-methyl-2-butanone

When 20 g. of Hg-resin was added to a stirred solution of 37.3 g. of 2-methyl-3-butyne-2-ol in 100 cc. of ethanol and 15 cc. of water there was spontaneous evolution of heat and darkening of the resin. After a short time the mixture was refluxed for twenty minutes. The resin was removed and the filtrate vacuum distilled. This distillate, B. P. 36–43° at 10 mm., was rectified in a small column to yield 18.8 g. (42%) of 3-hydroxy-3-methyl-2-butanone, B. P. 137–137.4°, $n_D^{26}$ 1.4176. This ketone yielded an oxime, M. P. 86.2–87.8° from water, and a semicarbazone, M. P. 164.0–166.6° w. dec. The lower boiling fractions undoubtedly contained some unchanged ethynylcarbinol and unsaturated ketone. There was also some higher boiling residue (ca. 6 g.). In another experiment in which 39.7 g. of ethynylcarbinol, 150 cc. of water, and 15 g. of Hg-resin were held near 80° for 5 hours there was obtained 33.0 g. (68.5%) of 3-hydroxy-3-methyl-2- butanone, B. P. 137–138°, $n_D^{23}$ 1.4145. This reaction is symbolized as follows:

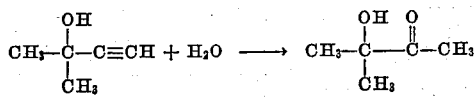

Following is an example of the process of preparing my improved catalytic resin:

EXAMPLE VIII

My catalytic mercuric resin was prepared by stirring Dowex-50 resin, 200–400 mesh, into a solution of sulfuric acid and mercuric oxide and then washing well with water by decantation (about 15 times). The resin was then collected, air dried, and then dried in a vacuum desiccator over anhydrous calcium chloride for two or three days. The sulfuric acid solution used was about 5–10% and contained about 1 g. of mercuric oxide which had been dissolved in it for every 100 g. of resin.

Following are examples of the process wherein ethynyl hydroxyl compounds were changed to acetyl compounds by the use of a catalyst of the sulfonated polystyrene synthetic resin to which no mercuric ion had been added.

EXAMPLE IX

*Conversion of 1-ethynylcyclohexanol to 1-acetylcyclohexene*

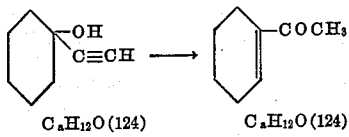

(a) To a stirred solution of 10.8 g. (0.087 mole) of ethynylcyclohexanol in 50 cc. of acetic acid and 5 cc. of water was added 10 g. of Dowex-50 resin. The mixture was heated and refluxed for one hour and cooled. The resin was removed by filtration. The organic product was taken into ether and the ether layer was washed with water and alkali. On rectification there was obtained 8.1 g. (75%) of 1-acetylcyclohexene, B. P. 83–87° at 18 mm., $n_D^{26}$ 1.4872. This was characterized by means of its semicarbazone (M. P. 219–221° w. decomp.). λ max mµ, ε, 24.150, and 2,4-dinitrophenylhydrazone, orange-red plates, M. P. 199–201° w. decomp., in agreement with literature values.

(b) To a stirred solution of 39.0 g. (0.31 mole) of 1-ethynylcyclohexanol in 100 cc. of acetic acid and 10 cc. of water was added 20 g. of resin. The mixture was heated and refluxed for 45 minutes. After suitable work-up the yield of 1-acetylcyclohexene, B. P. 96–98° at 22 mm., was 86.7%. Other yields varied from 83–86%.

(c) In a similar experiment to part (b) of this example, except that the resin recovered from similar run was used instead of a fresh batch of resin, the yield was 83.8%.

EXAMPLE X

*Conversion of diethylethynylcarbinol to 3-ethyl-3-penten-2-one*

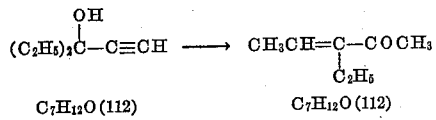

To a stirred solution of 24.0 g. (0.214 mole) of diethylethynylcarbinol in 50 cc. of acetic acid and 5 cc. of water was added 15 g. of resin. The mixture was heated and refluxed for thirty minutes. After removing the resin, the product was isolated as usual. There was obtained 20.2 g. (84%) of 3-ethyl-3-penten-2-one, B. P. 147–153° at 750 mm. The semicarbazone melted at 198–200°.

EXAMPLE XI

*Conversion of 1-ethynyl-2,2,6-trimethylcyclohexanol to 1-acetyl-2,2,6-trimethylcyclohexene*

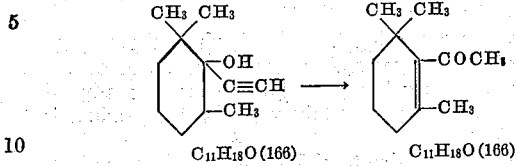

To a stirred solution of 20.0 g. (0.12 mole) of ethynylcarbinol in 80 cc. of acetic acid and 8 cc. of water was added 12 g. of resin. The mixture was heated and refluxed for ninety minutes—then worked up in the usual manner to yield 14.8 g. (74%) of ketone, B. P. 102–111° at 21 mm., $n_D^{27.5}$ 1.4804.

EXAMPLE XII

*3-ethyl-1-pentyl-3-ol to 3-ethyl-3-pentene-2-one*

A stirred mixture of 24.0 g. of 3-ethyl-1-pentyne-3-ol, 50 cc. of acetic acid, 5 cc. of water, and 15 g. of resin was held at reflux for thirty minutes. After the usual work-up 20.2 g. (84%) of the unsaturated ketone, B. P. 147–153° was obtained. I obtained only one semicarbazone, M. P. 198–200°, and found no evidence of the lower melting isomer reported previously. This reaction is symbolized as follows:

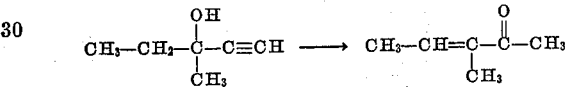

By the "usual work-up" or "suitable means" mentioned in the above Examples IX, X, XI and XII, is meant the following:

The resin is removed by filtration and the filtrate, diluted with three times its volume of water, is neutralized by the slow addition, with cooling, of 40% sodium hydroxide solution. The product is then extracted with ether. The ether solution is washed with water and saturated sodium chloride solution and is dried over powdered anhydrous magnesium sulfate. The ether is removed on a short column and the residue is rectified to yield the products stated in the examples.

It is to be understood that the above described embodiments of my invention are for the purpose of illustration only and various changes may be made therein without departing from the spirit and scope of the invention.

I claim:

1. A process of hydrating ethynyl hydrocarbons having a structure of:

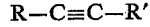

where R and R' represent a substituent selected from the group consisting of alkyl, aryl, aralkyl, cycloalkyl and alkenyl radicals and hydrogen according to the equation:

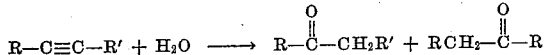

by contacting the ethynyl hydrocarbon with water and with a sulfonated polystyrene resin rendered active by the replacement of some but not all of the acidic hydrogen by mercuric ions to produce an acetyl hydrocarbon.

2. A process of converting compounds having an ethynyl function to compounds having a ketonic function which comprises the mixing of the ethynyl compounds with a sulfonated polystyrene resin rendered active by the replacement of some but not all of the acidic hydrogen by mercuric ions.

3. A process of converting compounds having an ethynyl function to compounds having a ketonic function which comprises the mixing of the ethynyl compounds with water in the presence of a sulfonated polystyrene resin rendered active by the replacement of some but not all of the acidic hydrogen by mercuric ions.

4. A process of preparing acetaldehyde which comprises bubbling a stream of acetylene through a stirred aqueous suspension of a synthetic sulfonated polystyrene resin of which some of the acidic hydrogens have been replaced by mercuric ions, and filtering the resultant solution from the resin.

5. A process according to claim 1 where the ethynyl hydrocarboin is 4-octyne and the product is 4-octanone.

6. A process according to claim 1 where the ethynyl hydrocarbon is 1-ethynylcyclohexene and the product is 1-acetylcyclohexene.

7. A process according to claim 2 where the compound having the ethynyl function is propargyl alcohol and the product is hydroxyacetone.

8. A process according to claim 2 where the compound having the ethynyl function is 1-ethynylcyclohexanol and the product is 1-acetylcyclohexanol.

9. A process according to claim 2 where the compound having the ethynyl function is 2-methyl-3-butyne-2-ol and the product is 3-hydroxy-3-methyl-2-butanone.

10. A process of preparing acetaldehyde which comprises bubbling a stream of acetylene through a stirred aqueous suspension of a synthetic sulfonated polystyrene resin of which some of the acidic hydrogens have been replaced by mercuric ions, and separating the resultant solution from the resin.

References Cited in the file of this patent

UNITED STATES PATENTS

| | | |
|---|---|---|
| 1,986,044 | Casaburi | Jan. 1, 1935 |
| 2,243,332 | De Simo | May 27, 1941 |
| 2,366,007 | D'Alelio | Dec. 26, 1944 |
| 2,593,417 | D'Alelio | Apr. 22, 1952 |
| 2,631,127 | D'Alelio | Mar. 10, 1953 |

FOREIGN PATENTS

| | | |
|---|---|---|
| 568,209 | Germany | Jan. 23, 1933 |

OTHER REFERENCES

Bennett: "Concise Chemical and Technical Dictionary," p. 596, Chemical Publishing Co., Brooklyn, N. Y. (1957).

Karrer: "Organic Chemistry," 1950, pp. 70–71.

Newman: J. Am. Chem. Soc. 75, 4740–4742 (October 1953).

UNITED STATES PATENT OFFICE
Certificate of Correction

Patent No. 2,853,520                                                         September 23, 1958

Melvin S. Newman

It is hereby certified that error appears in the printed specification of the above numbered patent requiring correction and that the said Letters Patent should read as corrected below.

Column 2, lines 21 to 23, for the right-hand portion of the formula reading

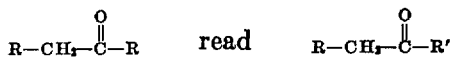

column 3, line 25, for the left-hand portion of the formula reading "CH$_4$CH$_2$CH$_2$C" read —CH$_3$CH$_2$CH$_2$C—; line 40, after "Dowex" insert —50—; line 44, for "EXAMPLES II" read —EXAMPLE II—; same column 3, lines 48 to 52, that portion of the formula should appear as shown below instead of as in the patent:

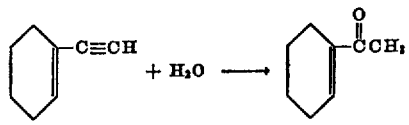

column 6, line 20, Example XII, in the heading, for "*3-ethyl-1-pentyl-3-ol*" read —*3-ethyl-1-pentyne-3-ol*—.

Signed and sealed this 12th day of May 1959.

[SEAL]

Attest:
KARL H. AXLINE,
*Attesting Officer.*

ROBERT C. WATSON,
*Commissioner of Patents.*